United States Patent Office 2,996,508
Patented Aug. 15, 1961

2,996,508
PROCESS OF PRODUCING SALTS OF Δ³-20α-YOHIMBENE COMPOUNDS OF THE RESERPINE SERIES
Robert Bucourt, Villiers-le-Bel, and Robert Joly, Montmorency, France, assignors to Les Laboratoires Francais de Chimiotherapie, Paris, France, a French body corporate
No Drawing. Filed July 30, 1958, Ser. No. 751,856
Claims priority, application France Aug. 9, 1957
2 Claims. (Cl. 260—287)

The present invention relates to salts of 20α-yohimbene compounds of the reserpine series and, more particularly, to crystalline salts of the lactone of 11,17α-dimethoxy-18β - hydroxy - 3,4 - dehydro - 20α - yohimbane-16β-carboxylic acid and to a process of producing same.

The preparation of the lactone of reserpic acid is already known. Said compound is obtained in the reaction step before the last step in the total synthesis of reserpine. 11,17α-dimethoxy-18β-acetoxy-16β-methoxy carbonyl-3-oxo-2,3-seco-20α-yohimbane, dextrorotatory in alcohol, which is used as starting material in said synthesis, is saponified and then converted into the lactone of 11,17α-dimethoxy - 18β - hydroxy - 3 - oxo - 2,3 - seco - 20α - yohimbane-16β-carboxylic acid, levorotatory in alcohol. Said lactone compound is subjected to the action of phosphorus oxychloride in order to cause cyclisation. The resulting quaternary ammonium base is reduced to the lactone of reserpic acid. Before this last reduction step, the solution of the lactone of the 11,17α-dimethoxy-16β-carboxy-18β-hydroxy-Δ³,⁴-20α-yohimbenium compound in phosphorus oxychloride is evaporated to dryness in a vacuum. The removal of the last amounts of excess phosphorus oxychloride is very burdensome and, in a production of reserpine on an industrial scale, very difficult to carry out. A resinous product is obtained which can be reduced with a low yield only. This, of course, of considerable disadvantage in the multi-step synthesis and production of reserpine.

It is one object of the present invention to provide well crystallizing salts of the lactone of the 11,17α-dimethoxy-16β-carboxy-18β-hydroxy-Δ³⁽⁴⁾-20α-yohimbenium base which are valuable intermediates in the synthesis of reserpine and which can readily be subjected to the reduction step.

Another object of the present invention is to provide a simple and effective process of producing such well crystallizing salts of said 20α-yohimbenium base.

These and other objects of the present invention and advantageous features thereof will become apparent as the description proceeds.

In principle, the present invention relates to salts of the lactone of 11,17α-dimethoxy-18β-hydroxy-Δ³⁽⁴⁾-20α-yohimbene-16β-carboxylic acid of the formula:

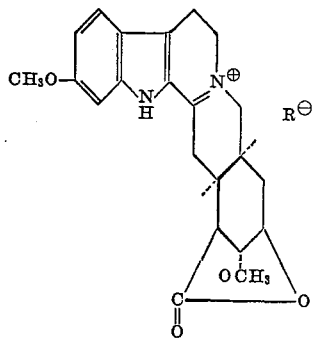

These salts are easily purified by recrystallization. They can readily be freed of the last traces of phosphorus oxychloride and can be purified by recrystallization. The crystalline salts can be reduced to the lactone of reserpic acid in a considerably higher yield than heretofore possible.

According to the present invention, the salts of the lactone of 11,17α-dimethoxy-18β-hydroxy-Δ³⁽⁴⁾-20α-yohimbene-16β-carboxylic acid are prepared by refluxing the levorotatory lactone of 11,17α-dimethoxy-18β-hydroxy-3-oxo-2,3-seco-20α-yohimbane-16β-carboxylic acid in a suitable amount of phosphorus oxychloride, concentrating the resulting reaction mixture, if necessary, diluting the concentrated mixture at a low temperature with water containing the acid the salt of which is to be formed, isolating the resulting precipitated salt by filtration, centrifuging, or evaporation of the reaction mixture to dryness.

According to a preferred embodiment of the present invention, phosphorus oxychloride is used in an amount between 1 part and 4 parts by volume for 1 part by weight of the levorotatory lactone compound used as starting material in the cyclization reaction. The preferred acids to form the well crystallizing salts are perchloric acid, phosphoric acid, and hydrochloric acid.

The following examples serve to illustrate the present invention without, however, limiting the same thereto. More particularly, the nature of the solvents and of the reagents and the order of introducing the same into the reaction vessel may be varied by those skilled in the art in accordance with the principles set forth herein and in the claims annexed hereto. The enantiomorphous dextrorotatory lactone of 11,17α-dimethoxy-18β-hydroxy-3-oxo-2,3-seco-20α-yohimbane-16β-carboxylic acid and the corresponding racemate may also be used as starting materials in place of the levorotatory lactone employed in the examples.

The melting points given in the examples are instantaneous melting points determined on the Maquenne block.

EXAMPLE 1

*Preparation of the crystalline perchlorate of the lactone of 11,17α - dimethoxy - 18β-hydroxy-Δ³⁽⁴⁾-20α-yohimbene-16β-carboxylic acid*

32 g. of the levorotatory (in alcohol) lactone of 11,17α-dimethoxy - 18β - hydroxy - 3 - oxo - 2,3 - seco - 20α - yohimbane-16β-carboxylic acid are added to 128 cc. of phosphorus oxychloride. The mixture is refluxed in a nitrogen atmosphere for two hours. After cooling to 20° C., 80 cc. of excess phosphorus oxychloride are distilled off in a vacuum. The concentrated reaction mixture is poured into a mixture of 1025 g. of crushed ice and 64 cc. of 66% perchloric acid. The temperature of the mixture is kept at 0° C. After stirring for 15 minutes, the precipitated crystals are filtered with suction and dried at room temperature in a desiccator over potassium hydroxide. The perchlorate of the lactone of 11,17α-dimethoxy - 18β - hydroxy - Δ³⁽⁴⁾-20α-yohimbene-16β-carboxylic acid is obtained in a yield of 99.5% of the theoretical amount. The new compound forms small yellow crystals which are slightly soluble in water and alcohol, insoluble in ether and benzene and soluble in acetone, chloroform, dimethylformamide, and 50% aqueous tetrahydrofurane. The salt melts at about 165–172° C. and has a rotatory power of $[\alpha]_D^{20} = -56° \pm 2°$ (concentration: 0.5% in 45% aqueous tetrahydrofurane).

EXAMPLE 2

*Preparation of the crystalline hydrochloride of the lactone of 11,17α - dimethoxy - 18β-hydroxy-Δ³⁽⁴⁾-20α-yohimbene-16β-carboxylic acid*

When working according to Example 1 and using concentrated hydrochloric acid in place of perchloric acid, the crystalline hydrochloride of the lactone of 11,17α- dimethoxy - 18β - hydroxy - Δ³⁽⁴⁾ - 20α - yohimbene-16β-carboxylic acid is obtained.

EXAMPLE 3

*Preparation of the crystalline phosphate of the lactone of 11,17α - dimethoxy - 18β-hydroxy-Δ³⁽⁴⁾-20α-yohimbene-16β-carboxylic acid*

When working according to Example 1 and using concentrated phosphoric acid in place of perchloric acid, the desired crystalline phosphate is obtained.

Other crystalline salts of said lactone are obtained by proceeding as described in Example 1 but using equimolecular amounts of other acids.

We claim:

1. In the process of producing crystalline acid salts of the lactone of 11,17α-dimethoxy-18β-hydroxy-Δ³⁽⁴⁾-20α-yohimbene-16β-carboxylic acid, the steps which comprise refluxing the lactone of 11,17α-dimethoxy-18β-hydroxy-3-oxo-2,3-seco-20α-yohimbene with phosphorus oxychloride to cause ring closure, concentrating the solution to remove part of the excess of phosphorus oxychloride, diluting the concentrated solution of the reaction mixture in phosphorus oxychloride at a low temperature with an aqueous solution of an acid forming a crystalline salt with the cyclized lactone selected from the group consisting of perchloric acid, hydrochloric acid and phosphoric acid, and separating the resulting crystalline quaternary salt of the lactone of 11,17α-dimethoxy-18β-hydroxy-Δ³⁽⁴⁾-20α-yohimbene-16β-carboxylic acid from the reaction mixture.

2. A process of producing crystalline acid salts of the lactone of 11,17α - dimethoxy - 18β - hydroxy-Δ³⁽⁴⁾-20α-yohimbene-16β-carboxylic acid which comprises the steps of adding a concentrated solution of the lactone of 11,17α-dimethoxy - 18β - hydroxy - Δ³⁽⁴⁾ - 20α - yohimbene-16β-carboxylic acid in phosphorus oxychloride to an aqueous solution of an acid selected from the group consisting of perchloric acid, hydrochloric acid and phosphoric acid at a low temperature and separating the resulting crystalline acid salt base of the lactone of 11,17α-dimethoxy-18β-hydroxy-Δ³⁽⁴⁾-20α-yohimbene-16β-carboxylic acid.

References Cited in the file of this patent

UNITED STATES PATENTS

| | | |
|---|---|---|
| 2,786,843 | Huebner | Mar. 26, 1957 |
| 2,796,420 | Weisenborn | June 18, 1957 |
| 2,809,198 | Huebner | Oct. 8, 1957 |
| 2,842,550 | Ulshafer | July 8, 1958 |
| 2,857,386 | Huebner | Oct. 21, 1958 |
| 2,877,225 | Taylor | Mar. 10, 1959 |
| 2,901,483 | Kuehne | Aug. 25, 1959 |

OTHER REFERENCES

Woodward: J. Am. Chem. Soc., vol. 78, pp. 2023–5 (1956).